United States Patent [19]
Gilboa

[11] Patent Number: 5,646,525
[45] Date of Patent: *Jul. 8, 1997

[54] THREE DIMENSIONAL TRACKING SYSTEM EMPLOYING A ROTATING FIELD

[75] Inventor: Pinhas Gilboa, Haifa, Israel

[73] Assignee: Elbit Ltd., Haifa, Israel

[*] Notice: The term of this patent shall not extend beyond the expiration date of Pat. No. 5,646,525.

[21] Appl. No.: 386,909

[22] Filed: Feb. 8, 1995

Related U.S. Application Data

[63] Continuation-in-part of Ser. No. 77,523, Jun. 16, 1993, Pat. No. 5,646,524.

[30] Foreign Application Priority Data

Jun. 16, 1992 [IL] Israel ............................. 102218
Feb. 8, 1994 [IL] Israel ............................. 108599

[51] Int. Cl.⁶ ................ G01B 7/14; G01S 5/04; G01R 33/02
[52] U.S. Cl. ................ 324/207.17; 324/207.22; 342/450
[58] Field of Search .............. 324/207.11, 207.13, 324/207.17, 207.22, 207.23, 207.26; 178/18, 19; 342/450, 451, 452

[56] References Cited

U.S. PATENT DOCUMENTS

| | | |
|---|---|---|
| 3,121,228 | 2/1964 | Kalmus . |
| 3,838,409 | 9/1974 | Minasy et al. . |
| 3,838,428 | 9/1974 | Reggia . |
| 3,838,429 | 9/1974 | Reggia . |
| 3,868,565 | 2/1975 | Kuipers . |
| 3,876,831 | 4/1975 | Wickham et al. . |
| 3,983,474 | 9/1976 | Kuipers . |
| 4,054,881 | 10/1977 | Raab . |
| 4,287,809 | 9/1981 | Egli et al. . |
| 4,314,251 | 2/1982 | Raab . |
| 4,394,831 | 7/1983 | Egli et al. . |
| 4,560,930 | 12/1985 | Kouno . |
| 4,812,812 | 3/1989 | Flowerdew et al. ............ 324/247 |
| 4,829,250 | 5/1989 | Rotier . |
| 4,849,692 | 7/1989 | Blood . |
| 5,002,137 | 3/1991 | Dickinson et al. ............ 324/346 |

FOREIGN PATENT DOCUMENTS

| | | |
|---|---|---|
| 058412 | 8/1982 | European Pat. Off. . |
| 2125168 | 2/1984 | United Kingdom . |
| 2197078 | 5/1988 | United Kingdom . |

*Primary Examiner*—Walter E. Snow
*Attorney, Agent, or Firm*—Cushman, Darby & Cushman IP Group of Pillsbury Madison & Sutro LLP

[57] ABSTRACT

Apparatus for determining the position and orientation of a helmet worn by a crew member in a vehicle including a generator, associated with the vehicle, which produces a rotating magnetic and electric field of fixed strength, orientation and frequency within at least a portion of the vehicle. The apparatus also includes a plurality of detectors each of which generates a signal proportional to at least one of the electric or magnetic fields at least one point associated with the helmet and calculation circuitry responsive to the signal for ascertaining the coordinates of the at least one point with respect to the generator and for determining the position and orientation of the helmet.

32 Claims, 8 Drawing Sheets

FIG.6
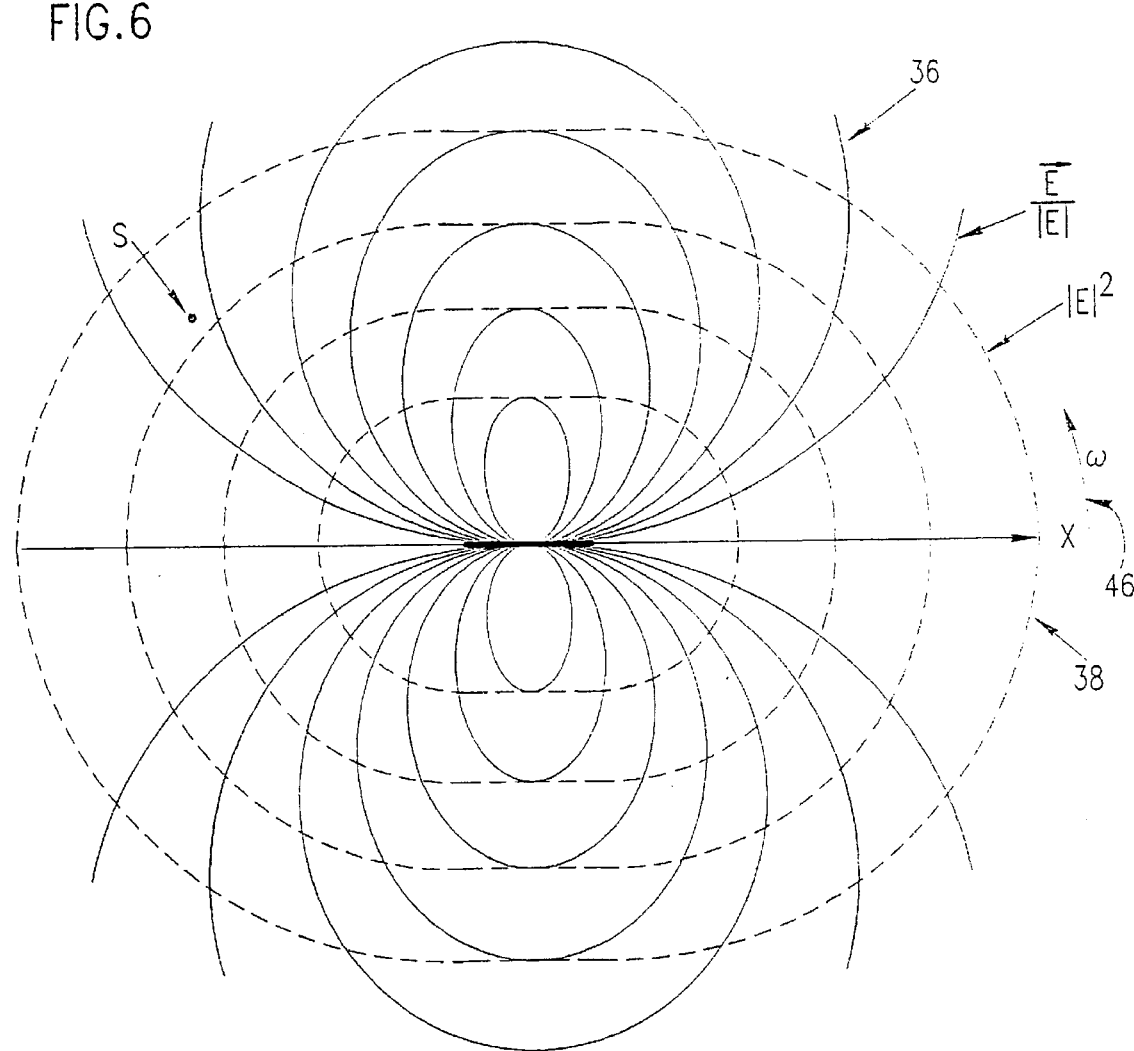
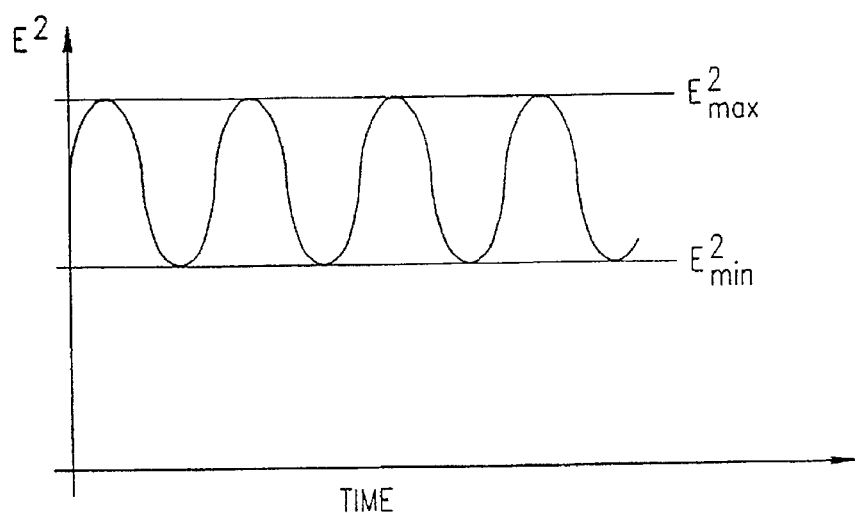
FIG.7

$V1 = a \sin(wt)$ $V2 = a \cos(wt)$

THREE DIMENSIONAL TRACKING SYSTEM EMPLOYING A ROTATING FIELD

RELATED APPLICATION

This application is a continuation in part of application Ser. No. 08/077,523, filed Jun. 16, 1993, now U.S. Pat. No. 5,646,524.

FIELD OF THE INVENTION

The present invention relates generally to electromagnetic tracking apparatus, and more specifically to a system for determining the location and orientation of a tracked object such as a helmet.

BACKGROUND OF THE INVENTION

Tracking systems based on the magnitude and phase differences of electromagnetic field generated at an external reference point and sensed by a device attached to the tracked object, are known in the patent literature.

U.S. Pat. No. 3,121,228 to Kalmus describes a system for finding the two dimensional location and direction of a vehicle in which a fixed generator and sensor coils on the vehicle are in the same plane, i.e. on the ground. The generator includes coils which produce a rotating magnetic dipole field. The generator and the sensor are each made of a set of two orthogonal coils. The generator's coils are energized with a 90 degrees phase difference by an alternating current source. The orientation of the sensors is obtained based on the phase difference between the signals generated in the sensor coils and the distance from the transmitter is based on the sum of the induced signals.

U.S. Pat. Nos. 3,868,565 and 3,983,474 to Kuipers details a system in which direction is measured by a nutating electromagnetic field in which a pointing vector tracks the direction of the sensor.

U.S. Pat. No. 4,054,881 to Rabb describes a system including three mutually orthogonal radiating antennas, each of which transmits electromagnetic radiation to three mutually orthogonal receiving antennas. Nine parameters that are calculated by the receiver, in combination with one known position or orientation parameter, determine the location and orientation of the receiving antennas. In another embodiment for measuring two dimensional (planar) position and orientation, the patent describes a system having two orthogonal radiating antennas and two orthogonal receiving antennas. In all the embodiments of Patent '881, the computation is based on an iterative computational scheme.

U.S. Pat. No. 4,287,809 to Egli et al, describes a helmet locator system in an aircraft consisting of a receiving antenna associated with the helmet and two transmitting coils fixed in the cockpit of the aircraft. The receiving antenna comprises three orthogonal field detectors. The position and orientation of the helmet are determined by measuring at the helmet a set of three different magnetic field vectors transmitted by the sequentially activated transmitting coils.

U.S. Pat. No. 4,314,251 to Rabb describes a system comprising either two orthogonal radiating antennas, and three non coplanar receiving antennas, or three radiating antennas and two receiving antennas. The system is based on time multiplexing of the radiating antennas to identify the source of the radiation.

U.S. Pat. No. 4,849,692 to Blood describes a similar system to that of Raab, except that a D.C. magnetic field is used instead of an A.C. field as in Raab.

SUMMARY OF THE INVENTION

The present invention provides a simplified system for determining the angular and linear displacements of an object relative to a fixed reference frame, by utilizing a rotating magnetic or electric field, preferably, a dipole filed.

The system is particularly useful for aviation purposes, for example, in providing an improved helmet locator for use by pilots of aircraft, although it is suitable for providing information on the three dimensional location and orientation of other objects such as vehicles.

The sensor of the present invention provides a more accurate measurement than that obtained by prior systems due to the fact that it is largely unaffected by noise and gain fluctuations. The invention also provides for a swifter calculation of position and orientation data due to its use of a simple mathematical model.

There is thus provided in a preferred embodiment of the invention, apparatus for determining the position and orientation of an object, for example a helmet worn by a crew member in a reference frame, for example, a vehicle, including:

a generator, associated with the reference frame, which produces a magnetic or electric field pattern rotating about a fixed axis;

a plurality of detectors each of which generates a signal proportional to at least one of the electric and magnetic fields at least one point associated with the object; and calculation circuitry, responsive to the signal, operative to ascertain the coordinates of the at least one point with respect to the generator and to determine the position and orientation of the object.

In a preferred embodiment of the invention, the plurality of detectors are a single set of three substantially orthogonal detectors associated with a given point relative to the object, each detector providing a signal proportional to one component of either the electric or magnetic field at the point.

In accordance with a preferred embodiment of the invention, the plurality of detectors includes at least three detectors each associated with different points on the object, each detector providing a signal related to the total field strength at its associated point.

Preferably, the calculation circuitry is adapted for determining the maximum and minimum of the square of at least one of the electric and magnetic field strengths at the at least one point and the detectors comprise a field strength sensor associated with the at least one point. The field strength sensor preferably has three orthogonal receivers which are preferably dipole receiving antennas or hall effect sensors.

In accordance with a preferred embodiment of the invention, the generator includes two dipole radiators having different orientation and phase, preferably in space and phase quadrature.

Alternatively, the generator includes three dipole radiators and a driver which drives the three dipole radiators with amplitudes and phases such that the rotating magnetic or electric field pattern is generated. In a preferred embodiment, the driver selectably activates any two of said three dipole radiators to produce said magnetic or electric field pattern. Preferably, the two active dipole generators are in space and phase quadrature. In a preferred embodiment of the invention, the magnetic or electric field pattern is substantially equivalent to the field of a rotating dipole.

In accordance with an alternative preferred embodiment of the invention the generator comprises a static field generator which is mechanically rotated.

In accordance with a preferred embodiment of the invention, the calculation circuitry is adapted for determining the phase and strength of the rotating field.

In one preferred embodiment the apparatus includes a reference sensor, having a fixed position and orientation with respect to the transmitter, adapted for determining the instantaneous strength of the field at the reference sensor.

In accordance with a preferred embodiment of the invention, the calculation circuitry is adapted for determining the elevation angle of the at least one point with respect to the plane of rotation of the magnetic field associated with the generator, preferably responsive to the corresponding ratios of minimum and maximum values of the field strength at the point.

In accordance with a preferred embodiment of the invention, the calculation circuitry is operative for determining the distance of the at least one point from the generator, preferably responsive to the corresponding minimum field strength at the point.

In accordance with a preferred embodiment of the invention, the calculation circuitry is operative for determining the elevation of the at least one point with respect to the plane of rotation of the field produced by the generator, preferably responsive to the corresponding field strength at the point and at a reference position.

In accordance with a preferred embodiment of the invention, the calculation circuitry is operative for determining the azimuthal angle of the at least one point responsive to the phase difference between the time-varying portions of the square of the field strength at the point and at the reference position or alternatively to the square of the drive signal to the generator.

In accordance with a preferred embodiment of the invention, the computation circuitry is operative for determining the orientation of the detectors associated with the at least one point, responsive to the signals generated at the point and the determined field at that point.

In accordance with a preferred embodiment of the invention, the apparatus also includes a second generator comprising a stationary dipole radiator axially oriented with the fixed axis and having a frequency different from the frequency of the rotating field.

BRIEF DESCRIPTION OF THE DRAWINGS

The present invention will be understood and appreciated from the following detailed description taken in conjunction with the drawings in which:

FIG. 6 is a schematic diagram showing a typical electromagnetic field plot of a rotating dipole field in accordance with a preferred embodiment of the invention;

FIG. 7 is a schematic representation of the strength of a rotating dipole field at a given point in space as a function of time, in accordance with a preferred embodiment of the invention;

DETAILED DESCRIPTION OF A PREFERRED EMBODIMENT

Figure 1:
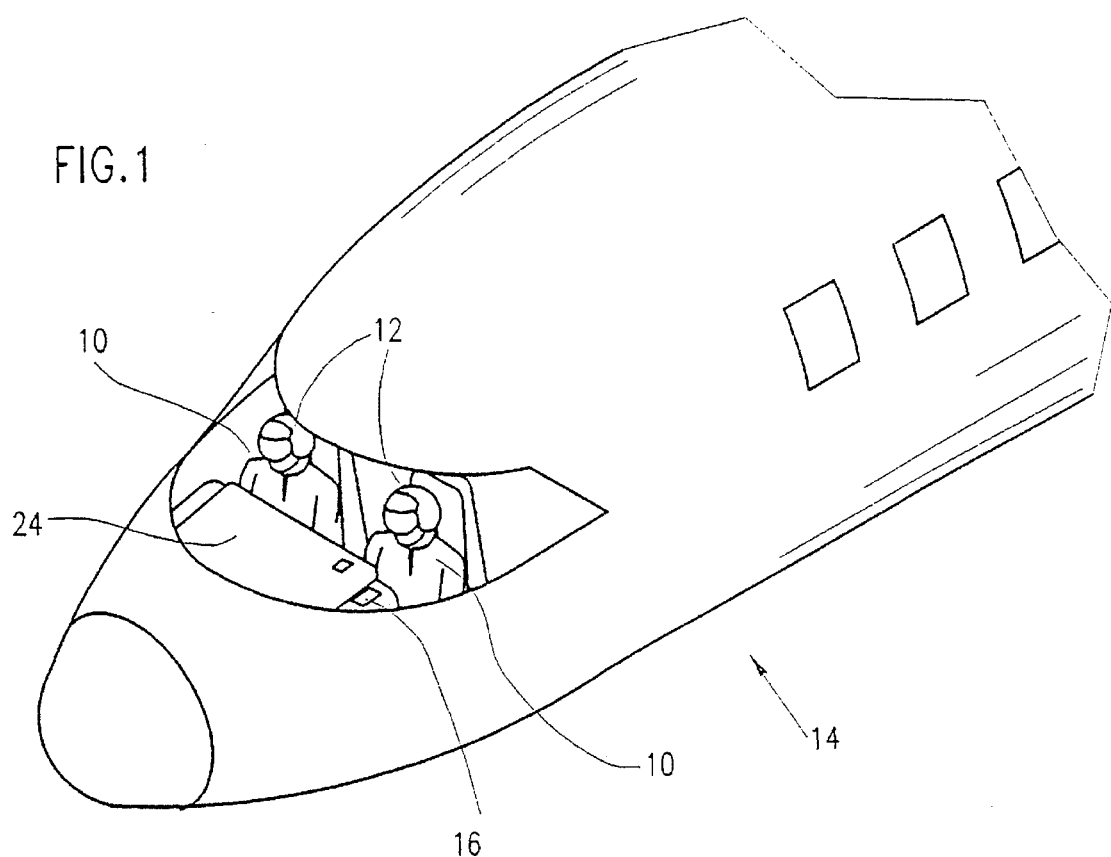
FIG. 1 is a general schematic representation of a helmet locator in accordance with a preferred embodiment of the invention.
Figure 2:
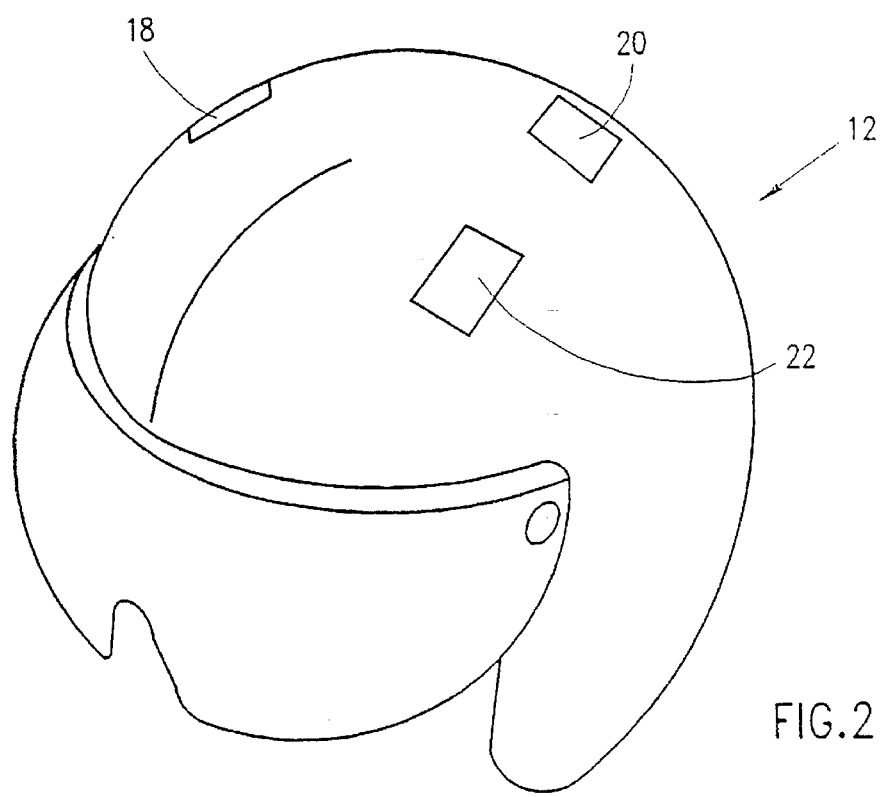
FIG. 2 is a schematic representation of a typical configuration of a helmet in accordance with a preferred embodiment of the invention.

Reference is made to FIGS. 1 and 2 which are a schematic representation of a helmet locating system in accordance with a preferred embodiment of the invention.

A crewman 10, wearing a helmet 12 is seated in the cockpit of an aircraft 14. Associated with aircraft 14 is a generator 16 which provides a rotating magnetic dipole field.

In a preferred embodiment of the invention the position and orientation of helmet 12, and thus the line of sight of the crewman, is determined by measuring the instantaneous strength of the rotating magnetic dipole field provided by generator 16 at one or more fixed points on the helmet. In one preferred embodiment of the invention the three components of the field are measured with respect to a reference coordinate system fixed in the helmet. In an alternative preferred embodiment of the invention, the field strength is measured at three points, although greater accuracy can be achieved if more than three points are used.

In the first preferred embodiment of the invention a sensor 18, is provided on (or in) helmet 12 as shown in FIG. 2, to sense the magnetic field strength. In the second embodiment of the invention two additional sensors 20 and 22 are also provided at different positions on the helmet.

In one preferred embodiment of the invention, each sensor comprises three orthogonal coils each of which provides an output signal proportional to the time derivative of one component of the local magnetic induction. In a second preferred embodiment of the invention, the three orthogonal coils are replaced by three orthogonal detectors, such as Hall detectors, the output signals of each of which are proportional to one component of the local magnetic field. The respective output signals of the coils (or Hall detectors) are each squared and summed with the squared output signals of the other elements in the sensor.

In a preferred embodiment of the invention, the helmet locator system also includes a reference sensor 24 shown in FIG. 1 (which is preferably similar to sensor 18 of FIG. 2), fixedly situated in the cockpit.

Generator 16 provides a rotating dipole magnetic field. In a preferred embodiment of the invention, as shown in FIG.

3, generator 16 comprises two orthogonal coils 26 and 28 which are driven by current sources (not shown) having the same current magnitude and which are in phase quadrature (space and phase quadrature). The coils are generally wound on bobbins and preferably have a ferromagnetic core 27. The field established by generator 16 is the same as a field generated by an actual rotating dipole and generator 16 can be represented by such a dipole.

Figure 4:
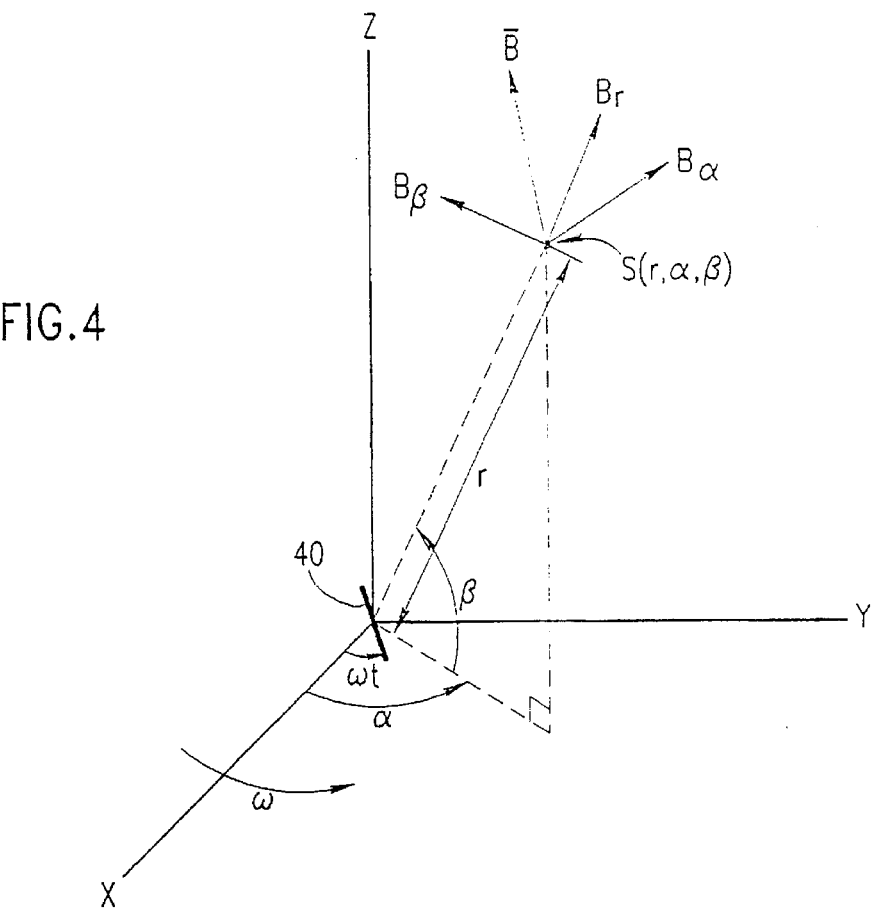
FIG. 4 is a schematic representation of the components of a field vector at a sensor location, in accordance with a preferred embodiment of the invention.

FIG. 4 shows the components $B_r$, $B_\alpha$ and $B_\beta$ of the magnetic field, $\vec{B}$, of the rotating dipole established by generator 16. The magnetic near field components are given by the formulae:

$$B_r = (2k/r^3) * \cos\beta * \cos(\alpha - wt) \quad (1)$$

$$B_\alpha = (k/r^3) * \sin(\alpha - wt) \quad (2)$$

$$B_\beta = (k/r^3) * \sin\beta * \cos(\alpha - wt) \quad (3)$$

where r is the distance from the dipole source to the point, $\beta$ is the elevation above the plane of rotation of the dipole (the x, y, plane), $\alpha$ is the azimuthal angle measured from a direction corresponding to the zero phase direction of the rotating field, w is the radian angular velocity of the rotating dipole field and k is a constant representing the magnetic dipole moment. Thus, wt represents the angular displacement, at a time t, of the rotating dipole from the x axis. Thus, as shown in FIG. 4, angles $\alpha$ and $\beta$ constitute respectively the azimuth angle with respect to the x axis, and the elevation angle with respect to the x,y plane, of a point S.

Figure 5:
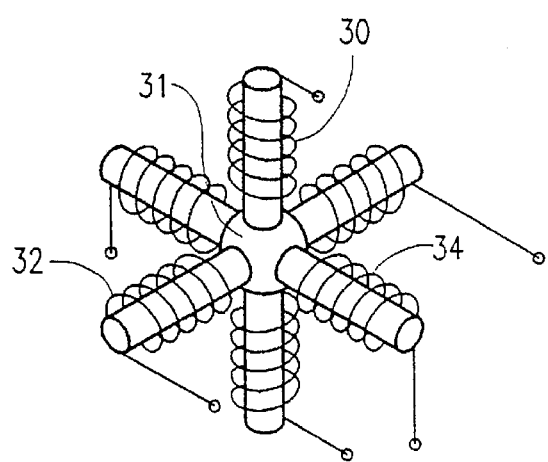
FIG. 5 is a schematic diagram of a sensor comprising three orthogonal coils in accordance with a preferred embodiment of the invention.

In a preferred embodiment of the invention, the sensors each comprise three orthogonal coils 30, 32 and 34 as shown in FIG. 5. The construction of the sensor is generally similar to that of the coils of FIG. 3 and preferably includes a ferromagnetic core 31. The signal produced by each of the coils is proportional to the time derivative of the magnetic field flux along the axis of the particular coil. Thus, assuming that the coils are oriented in the directions r, $\alpha$, and $\beta$ the signal generated by each coil is:

$$V_r = (2Kw/r^3) * \sin(\alpha - wt) * \cos\beta \quad (4)$$

$$V_\alpha = -(Kw/r^3) * \cos(\alpha - wt) \quad (5)$$

$$V_\beta = (Kw/r^3) * \sin(\alpha - wt) * \sin\beta \quad (6)$$

where K is related to the structure of the coil and is proportional to k defined above.

The electromotive force intensity at point S is proportional to the square root of the sum of the above signals and can thus be expressed by:

$$E^2 = (E_r)^2 + (E_\alpha)^2 + (E_\beta)^2 \quad (7)$$

or, in terms of V, $$V^2 = (K^2w^2/r^6) * (3\sin^2(\alpha - wt)\cos^2\beta + 1) \quad (8)$$
$$= (K^2w^2/r^6) * \{(3/4)*(1-\cos2\beta)*(1-\cos2(\alpha - wt)) + )\}$$

It is well known that the measured field strength is not a function of the orientation of orthogonal sensors, such that the assumption made in deriving the signals does not affect the final result.

In an alternative preferred embodiment of the invention, three orthogonal sensors whose output is proportional to the magnetic field are used. In this embodiment the output signals are:

$$V_r = (2K/r^3) * \cos(\alpha - wt) * \cos\beta \quad (9)$$

$$V_\alpha = (K/r^3) * \sin(\alpha - wt) \quad (10)$$

$$V_\beta = (K/r^3) * \cos(\alpha - wt) * \sin\beta \quad (11)$$

where K is related to the Hall constant of the detectors and is different from the K of the coils.

The total magnetic field strength at point S is proportional to the square, root of the sum of the squares of the above signals:

$$V^2 = (K^2/r^6) * (3\cos^2(\alpha - wt)\cos^2\beta + 1) \quad (12)$$
$$= (K^2w^2/r^6) * \{(3/4)*(1+\cos2\beta)*(1+\cos2(\alpha - wt)) + 1)\}$$

The general description of a dipole field in the x,y plane and at zero phase, are shown in FIG. 6. Solid lines 36 represent the lines of field induction and broken lines 38 represent equal value lines of the field strength. In the case of a magnetic dipole, the electromotive force lines are similar to the broken lines 38, but are rotated by 90° in space. As described above, the entire field configuration rotates around the dipole location 40 with a radian frequency w. As can be seen in equations (8) and (12) the field strength squared (and the sum of the squared signals) varies with radian frequency 2w.

The field strength ($E^2$, $B^2$ or $V^2$) is a scaler quantity. As shown in FIG. 6, the lines of equal value of field strength form an ellipse-like pattern. Thus, at a specific point in space S, the magnitude of the field strength will vary in time between two extremum values, representing the long and short axes of the ellipse-like pattern. The exact value and phase of this magnitude will depend on the position of S in three dimensions.

Reference is now made to FIG. 7 which shows the time dependent signal squared ($V^2$) associated with the rotating dipole, which is conveniently measured by adding the squared signals. As indicated above, the strength of the field (and hence the measured signal magnitude) associated with the rotating dipole at a specific point in space, oscillates with time between a maximum value $V^2_{max}$ and a minimum value $V^2_{min}$.

The expression for the signal squared reduces to the following expressions for $V^2_{max}$ and $V^2_{min}$ (for the coils and to within a multiplicative factor, for the Hall detectors):

$$V^2_{min} = (K^2w^2/r^6) \quad \text{at } \alpha = wt \quad (13)$$
$$V^2_{max} = (K^2w^2/r^6) * (\cos^2\beta + 1) \quad \text{at } \alpha = wt \pm \pi/2 \quad (14)$$

It is thus seen that the above extremum values of signal squared at a point S, apart from factors representing the rotating magnetic dipole and sensor coil construction, are dependent only on the elevation angle $\beta$ and on the distance, r, of point S from the generator. Thus $\beta$ and r are completely determined by the measurements of $V^2_{max}$ and $V^2_{min}$.

Explicit expressions for $\beta$ and r can now be obtained as:

$$r = (K^2w^2/V^2_{min})^{1/6} \quad (15)$$

$$\cos\beta = \{[(V^2_{max}/V^2_{min})-1]/3\}^{1/3} \quad (16)$$

Similar expressions hold for the Hall probe case.

Figure 8:
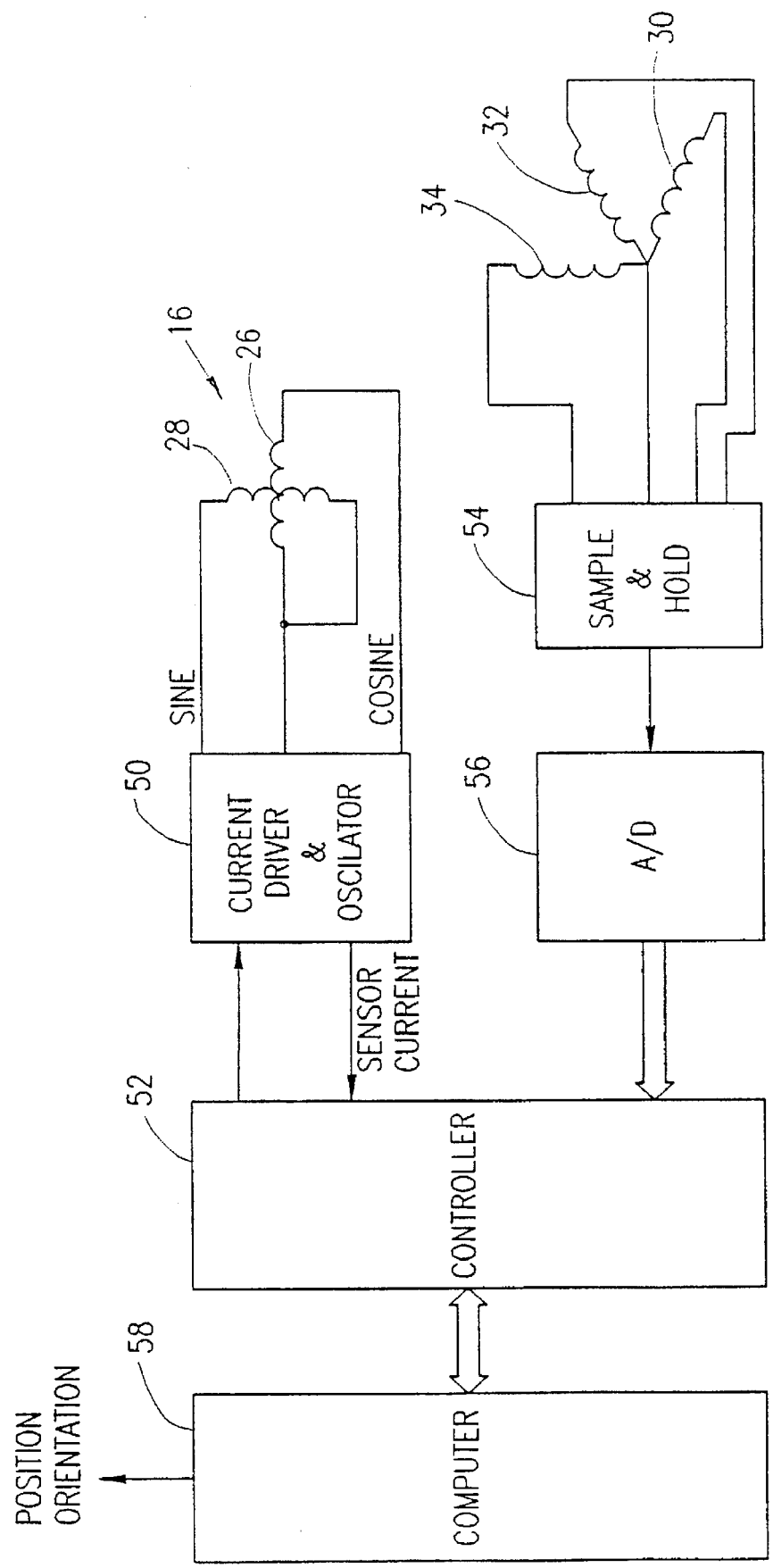
FIG. 8 is a block diagram of a detection and computing system in accordance with a preferred embodiment of the invention.

In one preferred embodiment of the invention the detection and computing system shown in FIG. 8 is used to measure the signals and to determine K. Coils 26 and 28 are fed by current drivers and oscillator 50, which is also operative for measuring the current driving the coils. This value of sensed current, including its phase is sent to controller 52. Controller 52 also receives separate digitized signals from sensor coils 30, 32 and 34, which are sampled and digitized by sample and hold circuits 54 and analog to digital convertors 56 at a rate which is much higher than the frequency w. Controller 52 passes both the sensed current amplitude and phase and received signal digitized values to a computer 58 which calculates the position and orientation of the helmet.

Filtration and calculation of the sensed signal parameters, such as amplitude and phase, are numerically calculated well known algorithms such as coherent detection. Since the signals are digitized continuously at a high rate, significant improvement of signal to noise ratio can be achieved by increasing the number of samples used in the calculation, with the signal to noise ratio being proportional to the square root of the number of samples used in the calculation. Increasing the number of samples also improves the accuracy of the calculations.

Controller 52 or computer 58 calculates values of $V^2_{max}$ and $V^2_{min}$. Preferably, in a calibration step, the value of $K^2$ is determined by placing the sensor at a fixed distance from the source and determining the ratio between the current in coils 26 and 28 and $V^2_{min}$. This value of $K^2$ is used in future calculations.

In an alternative embodiment of the invention the value of K is determined from the output of the reference sensor 24, which is situated at a fixed or known reference position R. Since the positional relationship of reference sensor 24 and generator 16 is known, the distance of point S from the generator is easily found as:

$$r_s = r_R (V_R \min / V_S \min)^{1/3}. \qquad (17)$$

The azimuthal angle of the sensor is determined from the phase difference between the driving currents of the generator coils and the signals generated by the sensor elements.

Where the circuit of FIG. 8 is used, these phases can be directly determined and the value of $\alpha$ is easily determined even without a reference sensor.

If a reference sensor is available and, since the azimuthal angle of the reference sensor, $\alpha_R$, is known, the azimuthal angle of the sensor, $\alpha_S$, is seen to be displaced from $\alpha_R$ by an angle $\delta\alpha$ given as:

$$\delta\alpha = \tfrac{1}{2}(\phi_1 - \phi_2) \qquad (18)$$

where $(\phi_1 - \phi_2)$ is the phase difference between the time varying portions of $V^2$ at positions R and S.

The orientation and location of the head of a given crewman 10 with respect to the aircraft 14 can ascertained by determining the position and orientation of the helmet 12 worn by the given crewman 10.

As indicated above the position of the sensor(s) is determined. In the preferred embodiment of the invention in which one sensor is present on the helmet, the orientation of the sensor is determined. From the position and orientation information the position and orientation of the helmet in space is determined.

The sensor orientation is determined by solving for the transformation matrix which transforms the field component values between the coordinate system (r,$\alpha$,S) related to the source and the coordinate system (k,l,m) related to the orthogonal sensor elements. This transformation can be expressed as the vector equation:

$$\vec{B}_{klm} = T \times \vec{B}_{r\alpha\beta} \qquad (19)$$

where $\vec{B}_{r\alpha\beta}$ are the field components of the magnetic field at the sensor in the generator coordinate space, $\vec{B}_{klm}$ are the field components of the magnetic field in the sensor coordinate space and T is the transformation matrix between the two. This matrix depends on the orientation of the sensors (and of the helmet) and on the angles $\alpha$ and $\beta$. Since the values of $\vec{B}_{klm}$ can be calculated from knowledge of the sensor position, and $\vec{B}_{r\alpha\beta}$ are known from the measured values of V for each of the coils and the known value of K, the 9 components of T and the orientation of the sensor can be determined.

When using a rotating dipole field only two linearly independent vectors, $\vec{B}_{klm}$ and $\vec{B}_{r\alpha\beta}$ exist. Hence knowledge of the field components of $\vec{B}_{klm}$ and $\vec{B}_{r\alpha\beta}$ yields only 6 equations. However, since the matrix T is orthonormal, and hence there are six linearly independent equations of the dot products of the rows (or columns) of the matrix for the orthonormality condition. Using the six linear equations of equations (19) and three of the orthonormality condition equations, the rotation transform T and thus the orientation of the sensor is well defined. Due to the complexity of these equations, they are best solved using computer 58.

In an alternative method, three sensors are placed on the helmet. By employing one of the methods described above the location (but not the orientation) of each of the sensors in the reference frame associated with the generator is determined. Since the location of the sensors in a coordinate system associated with the helmet is known from the known placement of the sensors, a determination of the location of those points in an external reference frame establishes the transformation coefficients between an helmet coordinate system and the external reference frame.

Since the solution outlined above may lead to multi-valued solutions for the elevation and the azimuthal angles, it is appreciated that, under circumstances where some auxiliary reference data is lacking, the capability of the system described herein to track an object is limited to a single space quadrant. When the generator is correctly placed the ambiguity causes no problem in practice due to the limited motion of the helmet.

To enable the system to produce unambiguous position determinations in two quadrants, a second radiated field, preferably perpendicular to the plane of the rotating field is added.

Figure 3:
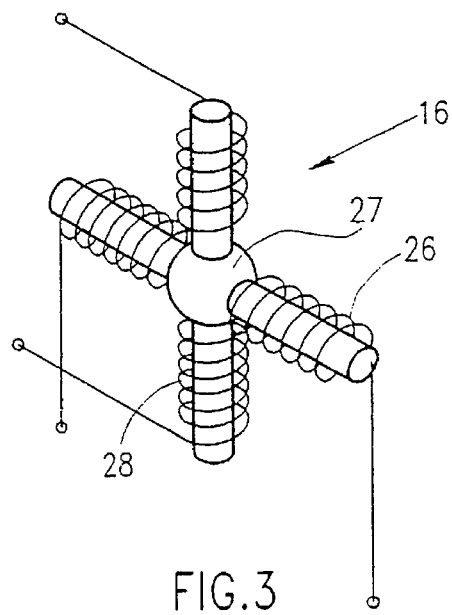
FIG. 3 is a schematic description of a rotating dipole generator comprising two orthogonal coils in accordance with a preferred embodiment of the invention.
Figure 12:
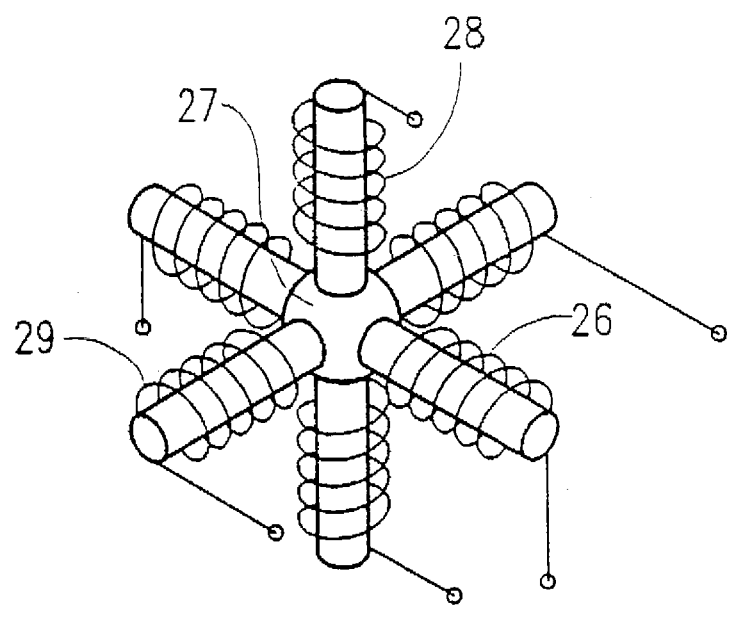
FIG. 12 is a schematic diagram of an alternative magnetic field generator in accordance with a preferred embodiment of the present invention.

A preferred embodiment of a radiator which produces such a field is shown in FIG. 12, which is similar to that of FIG. 3 with the addition of coils 29. In operation, coils 26 and 28 are fed by currents of the same frequency in phase quadrature. The field generated by the currents in coils 26 and 28 (which are in space and phase quadrature) thus produce a rotating dipole field as aforesaid. Coil 29 is fed by a current having a frequency different enough from the rotating field frequency such that the filtration system, preferably a coherent detection scheme as described above with respect to FIG. 8, can distinguish between the two frequencies.

Since the radiation and sensing is performed continuously and independently for the two fields, there is no loss of dynamic accuracy for the system. The field values at a sensor location from this z directed radiator are:

$$B_r^z = (2k/r^3)*\sin\beta \quad (20)$$

$$B_\alpha^z = 0 \quad (21)$$

$$B_\beta^z = (k/r^3)*\cos\beta \quad (22)$$

The product of this vector field and the field given by Equations (1)–(3) above, for the condition $w*t_o=\alpha$, is:

$$\vec{B}^z * \vec{B}(t_o) = (5k^2/r^6)*\sin(2\beta) \quad (23)$$

This function changes polarity for a second adjacent quadrant, so that a two quadrant space capability can be achieved. Furthermore, the value of β determined from equation 23 may be compared to that determined from equation 16 in order to improve the overall accuracy of the determination of β.

Figure 13:
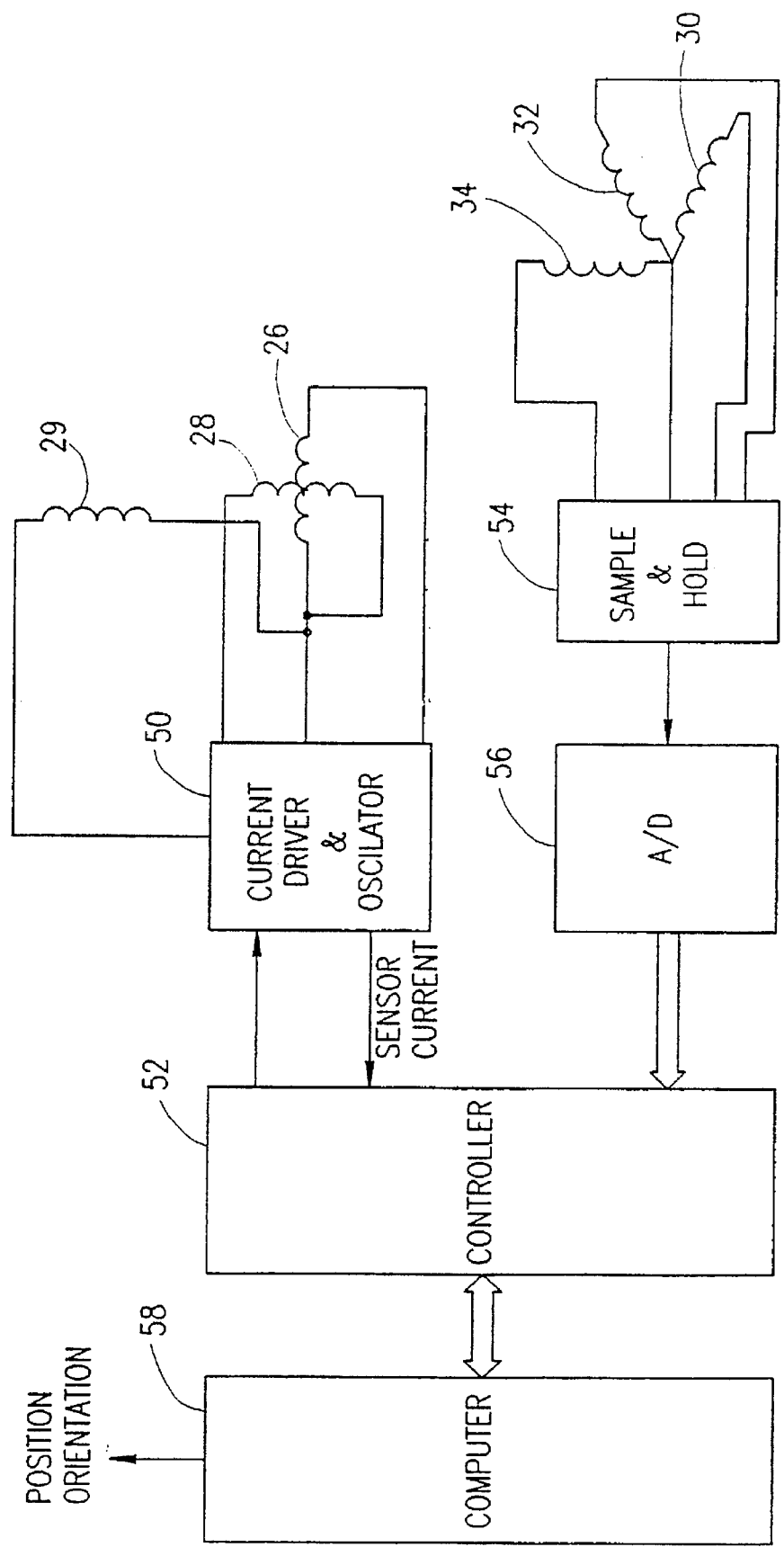
FIG. 13 is a block diagram of a detection and computing system in accordance with a preferred embodiment of the invention and operative with the generator of FIG. 12.

A circuit for the generation and detection of the rotating fields is shown schematically in FIG. 13, which is similar to that of FIG. 8, except for the addition of the driver for coil 29. Of course the software in controller 52 and computer 58 are adapted to determine the parameters of the signal at the frequency of coil 29 and to solve equation 23.

In an alternative preferred embodiment of the present invention, two of the three coils 26, 28 and 29 are selectably fed by current drivers and oscillator 50 with currents of the same frequency in phase quadrature. These two coils, which may be coils 26 and 28, coils 28 and 29 or coils 26 and 29, will be hereinafter referred to as the generating coils. The fields generated by the generating coils, which are in space and phase quadrature, thus produce a rotating dipole field as aforesaid. It should be appreciated that the rotating fields produced by the three alternative combinations of generating coils, i.e 26 and 28, 28 and 29 and 26 and 29, rotate about three different axes. In the embodiment of FIG. 12, for example, the three alternative axes of rotation form an orthogonal set.

In one embodiment of the present invention, the remaining coil, be it coil 26, 28 or 29, depending on which coils are selected as generating dipoles, is fed by drivers and oscillator 50 with a current having a frequency different enough from the rotating field frequency. This enables the filtration system to distinguish between the two frequencies, as described above.

In another embodiment of the invention, no current is fed into the remaining coil and, in such case, the generation and detection system is similar to that of FIG. 8 with the generating coils functioning as generator 16 of FIG. 3.

For selectable activation of coils 26, 28 and 29, current drivers and oscillator 50 preferably includes a switch (not shown) which selectably activates coils 26 and/or 28 and/or 29 to produce the magnetic fields described above. The switch may be user operated, in which case the user selects the fixed axis of the rotating field or, preferably, the switch may be automatically controlled by suitable electronics in controller 52. For example, periodic switching among the three alternative rotating fields, in accordance with a preselected pattern, provides cross references which may eliminate the above mentioned problem of multiple solutions.

In yet another embodiment of the present invention, coils 26, 28 and 29 are all fed with electric currents. It should be appreciated that by proper selection of the amplitudes and phases fed to the three coils, it is possible to produce magnetic field patterns rotating about preselected fixed axes other than the orthogonal set of axes described above. For suitable choices of amplitude and phase, the field (which may be a dipole field) can be made to revolve about any arbitrary axis.

As described above, use of a single rotating magnetic or electric field may lead to multi-valued solutions for the elevation and the azimuthal angles and, thus, under circumstances where some auxiliary reference data is lacking, the capability of the system to track an object is limited to a single space quadrant. However, since the selectable activation of coils 26, 28 and 29 provides at least three alternative axes of rotation for the single magnetic field, as described above, the ambiguity in tracking an object may be substantially reduced, or even eliminated, by proper selection of the generating coils and/or the amplitudes and phases fed to the coils.

The invention has been described thus far with respect to embodiments in which the rotating dipole field is a magnetic field which is made to rotate by the provision of a at least two coils in phase and space quadrature. However in other preferred embodiments of the invention other methods are employed to generate the rotating field.

Figure 9A:
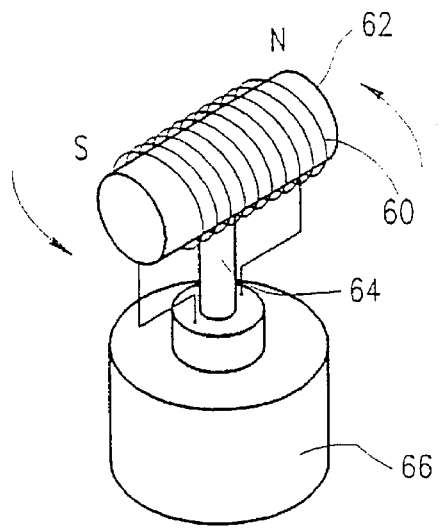
FIGS. 9A and 9B are schematic diagrams of alternative generators of a rotating magnetic field.
Figure 9B:
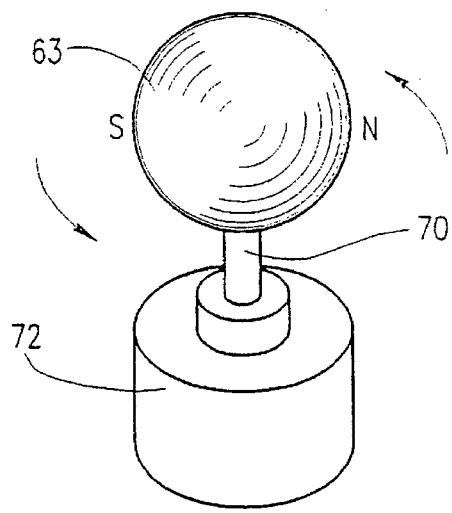

FIGS. 9A and 9B show two alternative methods for generating a rotating dipole magnetic field. FIG. 9A shows a coil 60 preferably wound on a magnetic core 62 is energized by D.C. current. The coil is mounted on a shaft 64 which is rotated by a motor 66. FIG. 9B shows a permanent magnet 68 mounted on a shaft 70 and rotated by motor 72. Preferably, motors 66 and 72 are hydraulic motors, since the fields associated with electric motors may interfere with the operation of the system.

In an alternative preferred embodiment of the invention the fields which are generated by generator 16, in the embodiment of FIG. 3, or the fields generated by the different combinations of coils 26, 28 and 29, in the embodiments of FIG. 12, may be rotating electric fields rather than rotating magnetic fields as in the above described embodiments.

Figure 10A:
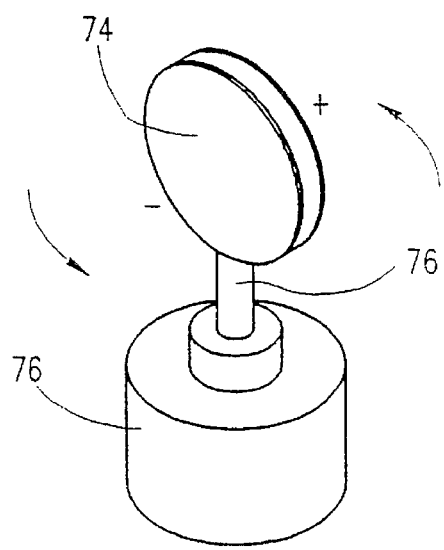
FIG. 10A is a schematic diagram of a generator of a rotating electric field.
Figure 10B:
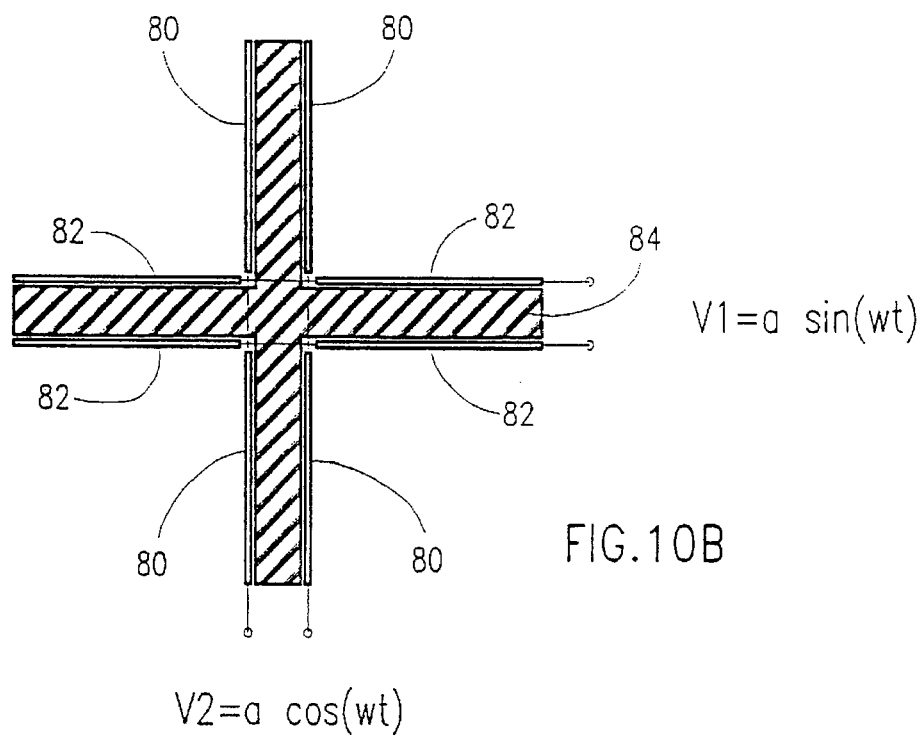
FIG. 10B is a schematic cross-sectional diagram of an alternative rotating electric dipole field generator.

FIG. 10A shows a charged capacitor 74 attached to shaft 76 and rotated by motor 78. An alternative arrangement is shown in FIG. 10B in which two planar capacitors 80 and 82 (shown in cross-section) are in space quadrature and are energized by signals in time quadrature. The space between the respective capacitor plates of capacitors 80 and 82 are preferably filled with dielectric material 84. Both the arrangements of FIGS. 10A and 10B produce rotating electric dipole fields. These electric dipole fields are similar in form to that of the magnetic dipole fields and if suitably detected, simple variations of the above equations can be used to determine the helmet position and orientation.

Figure 11:
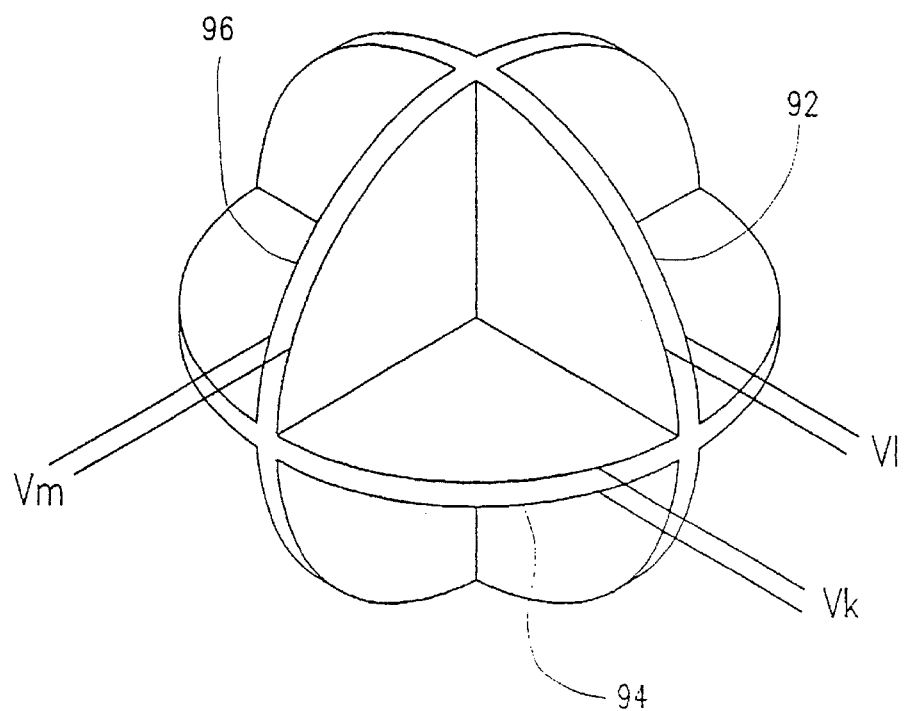
FIG. 11 is schematic diagram of a receiver for electric dipole fields.

FIG. 11 shows, very schematically, a sensor for the electric fields generated by the field generators of FIGS. 10A and 10B. Three capacitors 92, 94 and 96 are in space quadrature and respectively detect three orthogonal components of the rotating electric field. These three components are used, in a manner completely analogous to that of the magnetic field examples to produce the position and orientation of the helmet.

It should be appreciated that with proper variations to the generators of FIGS. 10A and 10B, analogous to those described above with reference to the magnetic field system of FIGS. 12 and 13, it is possible to construct an electric field generator which generates electric dipole fields rotating about preselected fixed axis. This can be achieved, for example, by adding an additional planar capacitor, perpendicular to both of capacitors 80 and 82, so as to form a three plate arrangement similar to the sensor of FIG. 11.

It will be appreciated that the system described herein is insensitive to errors resulting from noise and gain fluctuation since the orientation parameters are derived from field amplitudes and phase differences which are largely unaffected by such error-causing factors.

However, error may still arise from other sources. One of these sources of error is the physical non-orthonormality of radiators 26, 28 and 29 (FIG. 12). This error may be eliminated by measuring, in a calibration step, the difference in field intensity and the direction of the two axes and by controlling the drive currents to correct for the intensity and/or to correct the sensed signals by appropriate correction factors as determined during calibration.

A second possible source of error is the non-orthonormality of the coils 30, 32 and 34 (FIG. 5). This error can be corrected by determining the non-orthonormality and correcting the sensed vector $V_{klm}$ by a correcting matrix the achieve a corrected orthonormal signal.

A third source of error is distortion of the field caused by the metal mass of the cockpit. This may be corrected by a mapping technique which determines the difference between the actual position and orientation of a sensor and the measured position and orientation. A correction matrix, or correction polynomials are determined based on a number of such measurements which matrix or polynomial is used to correct such errors when the system is operative.

The invention has been described using the example of rotating dipole fields. Other rotating fields can be used in alternative embodiments of the invention. For example a quadrapole field, while it leads to different equations, contains information which will allow for the derivation of the orientation and position of the helmet. In fact, any rotating field which has a functional dependence on the distance from the generator, the azimuth and the elevation can be used to determine the position and orientation. In these cases the mathematical details of the calculation will, of course, be adapted to the particular field used.

The invention has been described in embodiments which determine the position and orientation of a helmet. The invention can also be used to track the position and orientation of other objects, both within an enclosed space and in open space.

It will be appreciated by persons skilled in the art that the present invention is not limited by the description and example provided hereinabove. Rather, the scope of this invention is defined only by the claims which follow:

I claim:
1. Apparatus for determining the position and orientation of an object relative to a reference frame, comprising:
   a generator, associated with the reference frame, which produces a magnetic or electric field pattern rotating about a fixed axis;
   a plurality of detectors, each of which generates at least one signal responsive to at least one of the electric and magnetic fields at at least one point associated with the object; and
   calculation circuitry, responsive to the at least one signal, which determines the coordinates of the at least one point associated with each of said detectors with respect to the generator based on the total field strength at the at least one point, and which determines the three-dimensional position and orientation of the object, wherein the generator comprises two dipole radiators having different orientation and phase.

2. Apparatus according to claim 1 wherein each of the plurality of receivers comprises a single set of three substantially orthogonal detectors associated with a given point relative to the object, each receiver providing a signal proportional to one component of either the electric or magnetic field at the point.

3. Apparatus according to claim 1 wherein the plurality of detectors includes at least three detectors each associated with different points on the object, each detector providing at least one signal related to the total field strength at its associated point.

4. Apparatus according to claim 1 wherein the calculation circuitry is adapted for determining the maximum and minimum of the square of at least one of the electric and magnetic field strength at the at least one point.

5. Apparatus according to claim 4 wherein the detectors comprise a field strength sensor associated with the at least one point.

6. Apparatus according to claim 5 wherein the field strength sensor comprises three orthogonal receivers.

7. Apparatus according to claim 6 wherein the receivers comprise dipole receiving antennas.

8. Apparatus according to claim 6 wherein the receivers comprise magnetic field sensors.

9. Apparatus according to claim 6 wherein the orthogonal receivers are electric field sensors.

10. Apparatus according to claim 1 wherein the two dipole radiators are in space and phase quadrature.

11. Apparatus according to claim 1 wherein the generator comprises three dipole radiators and a driver which drives the three dipole radiators with amplitudes and phases such that said magnetic or electric field pattern is generated.

12. Apparatus according to claim 11 wherein said driver selectably activates any two of said three dipole radiators to produce said magnetic or electric field pattern.

13. Apparatus according to claim 12 wherein the two active dipole generators are in space and phase quadrature.

14. Apparatus according to claim 11 wherein the magnetic or electric field pattern is substantially equivalent to the field of a rotating dipole.

15. Apparatus according to claim 1 and also comprising a second generator including a stationary dipole radiator axially oriented with the fixed axis and having a frequency different from the frequency of the rotating field.

16. Apparatus according to claim 1 wherein the generator comprises a rotating static field generator.

17. Apparatus according to claim 16 wherein the magnetic or electric field pattern is substantially equivalent to the field of a rotating dipole.

18. Apparatus according to claim 1 wherein the calculation circuitry is adapted for determining the phase and strength of the rotating field.

19. Apparatus according to claim 17, and including a reference sensor, having a fixed position and orientation with respect to the transmitter, adapted for determining the instantaneous strength of the field at the reference sensor.

20. Apparatus according to claim 1 wherein the calculation circuitry is adapted for determining the elevation angle of the at least one point with respect to the plane of rotation of at least one of the magnetic or electric field associated with the generator.

21. Apparatus according to claim 4 wherein the calculation circuitry is operative for determining the elevation angle of the at least one point responsive to the corresponding ratios of minimum and maximum values of the field strength at the point.

22. Apparatus according to claim 1 wherein the calculation circuitry is operative for determining the distance of the at least one point from the generator.

23. Apparatus according to claim 4 wherein the calculation circuitry is operative for determining the distance of the at least one point responsive to the corresponding minimum field strength at the point.

24. Apparatus according to claim 23 wherein the distance is inversely proportional to the sixth root of the minimum of the square of the field strength.

25. Apparatus according to claim 1 wherein the calculation circuitry is operative for determining the elevation of the at least one point with respect to the plane of rotation of the field produced by the generator.

26. Apparatus according to claim 25 wherein the calculation circuitry is operative for determining the elevation of the at least one point with respect to a reference direction responsive to the corresponding field strength at the point and at a reference position.

27. Apparatus according to claim 25 wherein the calculation circuitry is operative for determining the elevation of the at least one point responsive to the minimum and maximum of the square of the field strength at the point.

28. Apparatus according to claim 25 wherein the calculation circuitry is operative for determining the azimuthal angle of the at least one point responsive to the phase difference between the time-varying portions of the square of the field strengths at the point and at the reference position.

29. Apparatus according to claim 25 wherein the calculation circuitry is operative for determining the azimuthal angle responsive to the phase difference between the square of the signal measured at the at least one point and the square of the drive signal to the generator.

30. Apparatus according to claim 1 wherein the computation circuitry is operative for determining the orientation of the detectors associated with the at least one point, responsive to the signals generated at the point and the determined field strength at that point.

31. Apparatus according to claim 1 wherein the object is a helmet, and the computation circuitry is operative to determine the orientation of the head of a person wearing the helmet.

32. Apparatus according to claim 1 and also comprising a second generator including a stationary dipole radiator axially oriented with the fixed axis and having a frequency different from the frequency of the rotating field.

* * * * *